US009071862B2

(12) United States Patent
Chen et al.

(10) Patent No.: US 9,071,862 B2
(45) Date of Patent: Jun. 30, 2015

(54) HANDHELD ELECTRONIC DEVICE AND REMOTE CONTROL METHOD

(75) Inventors: Hsaio-Han Chen, Hsinchu (TW); Yi-Bing Lin, Hsinchu (TW); Coral Ying-Rong Sung, Hsinchu (TW); Ren-Huang Liou, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 193 days.

(21) Appl. No.: 13/442,149

(22) Filed: Apr. 9, 2012

(65) Prior Publication Data
US 2013/0137466 A1    May 30, 2013

(30) Foreign Application Priority Data
Nov. 29, 2011   (TW) .............................. 100143811 A

(51) Int. Cl.
*H04N 21/422*   (2011.01)
(52) U.S. Cl.
CPC ... *H04N 21/42206* (2013.01); *H04N 21/42222* (2013.01)
(58) Field of Classification Search
CPC .. H04M 2203/408; G01S 1/44; H04W 4/026; H04W 28/08
See application file for complete search history.

(56) References Cited

U.S. PATENT DOCUMENTS

| 5,043,646 A | 8/1991 | Smith, III et al. |
| 2003/0159633 A1 | 8/2003 | Upadhyaya et al. |
| 2005/0192683 A1 | 9/2005 | Narayanan |
| 2006/0109143 A1 | 5/2006 | Rekimoto |
| 2011/0178707 A1 | 7/2011 | Sachs et al. |
| 2011/0223899 A1 | 9/2011 | Hiraide |
| 2011/0288816 A1* | 11/2011 | Thierman ............. 702/151 |
| 2013/0308120 A1* | 11/2013 | Portegys ............. 356/21 |

FOREIGN PATENT DOCUMENTS

| CN | 1692370 A | 11/2005 |
| CN | 102196088 A | 9/2011 |
| JP | 2011-193426 | 9/2011 |
| WO | WO 02-43023 A2 | 5/2002 |

OTHER PUBLICATIONS

Extended European Search Report issued by European Patent Office on Jun. 26, 2013.
Hsiao-Han Chen et al., "Direction-based Wireless Remote Controller: A Smartphone Application", Journal of Wireless Mobile Networks, Ubiquitous Computing, and Dependable Applications (JoWUA), vol. 2, No. 2, pp. 33-45, Jun. 2011.

* cited by examiner

*Primary Examiner* — Charles Appiah
*Assistant Examiner* — Randy Peaches
(74) *Attorney, Agent, or Firm* — Rabin & Berdo, P.C.

(57) ABSTRACT

A handheld electronic device and a remote control method are provided. The handheld electronic device comprises a display unit, an electronic compass and a processing unit. The reference locations are correlated with the controlled device. The processing unit constructs the coordinate system and calculates the reference location coordinates for the reference locations in the coordinate system. After the coordinate system is constructed, the electronic compass measures the current direction information directed towards the controlled device to be remote controlled from a current location. The processing unit controls the display unit to display a control interface of the controlled device to be remote controlled. The electronic compass measures origin direction information directed towards at least two reference locations from an origin location and measures move direction information directed towards the reference locations from a move location.

18 Claims, 9 Drawing Sheets

HANDHELD ELECTRONIC DEVICE AND REMOTE CONTROL METHOD

This application claims the benefit of Taiwan application Serial No. 100143811, filed Nov. 29, 2011, the subject matter of which is incorporated herein by reference.

BACKGROUND OF THE INVENTION

1. Field of the Invention

The invention relates in general to an electronic device, and more particularly to a handheld electronic device used at the indoor and a remote control method.

2. Description of the Related Art

To further increase the convenience of use, more and more home appliances are operated via remote controllers. Through the use of remote controllers, the operations of the home appliances are made more convenient, and the dispositions of the home appliances become more flexible, and there is no need to worry about the problems of manual operation. Meanwhile, each home appliance is equipped with respective remote controller to avoid the mutual interference between different remote controllers. However, the user not only has to carry several remote controllers but also has to remember plenty of corresponding function operations for different devices.

SUMMARY OF THE INVENTION

The invention is directed to a handheld electronic device and the remote control method. When the user points a controlled device with a handheld electronic device at the indoor, a control interface of the controlled device to be remote controlled is displayed correspondingly.

According to one embodiment of the present invention, a handheld electronic device is provided. The handheld electronic device comprises a display unit, an electronic compass and a processing unit. The electronic compass measures the origin direction information directed towards at least two reference locations from an origin location and measures the move direction information directed towards the reference locations from a move location. The reference locations are correlated with the controlled device. The processing unit couples with the electronic compass and the display unit. The processing unit, according to the origin location, the move location, the origin direction information and the move direction information, constructs the coordinate system and calculates the reference location coordinates for the reference locations in the coordinate system. After the coordinate system is constructed, the electronic compass measures the current direction information directed towards the controlled device to be remote controlled from a current location. The processing unit controls the display unit to display a control interface of the controlled device to be remote controlled according to the coordinate system, the reference location coordinates and the current direction information.

According to one alternate embodiment of the present invention, a remote control method. The remote control method is for use in a handheld electronic device. The handheld electronic device comprises a display unit and an electronic compass. The remote control method comprises the following steps. The origin direction information directed towards at least two reference locations from an origin location is measured by an electronic compass. The move direction information directed towards the reference locations from a move location is measured by the electronic compass. According to the origin location, the move location, the origin direction information and the move direction information, a coordinate system is constructed and the reference location coordinates for the reference locations in the coordinate system are calculated. After the coordinate system is constructed, the current direction information directed towards the controlled device to be remote controlled from a current location is measured by the electronic compass according to the coordinate system, the reference location coordinates and the current direction information, and a control interface of the controlled device to be remote controlled is displayed.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
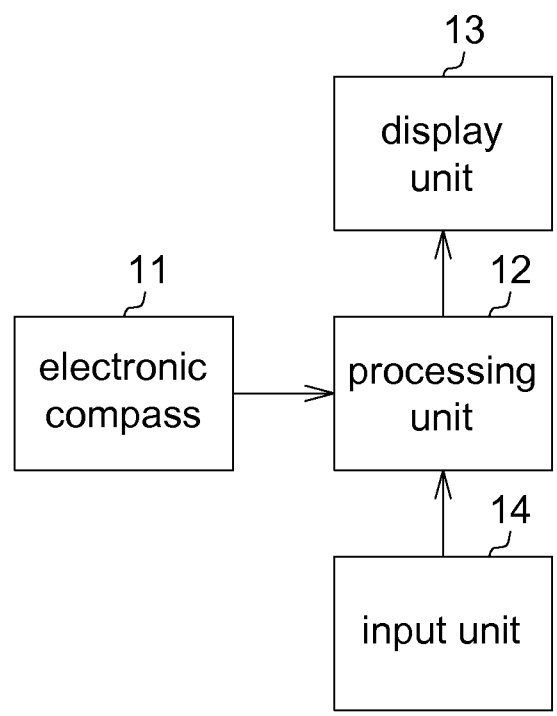
FIG. 1 is a block diagram showing a handheld electronic device.
Figure 2:
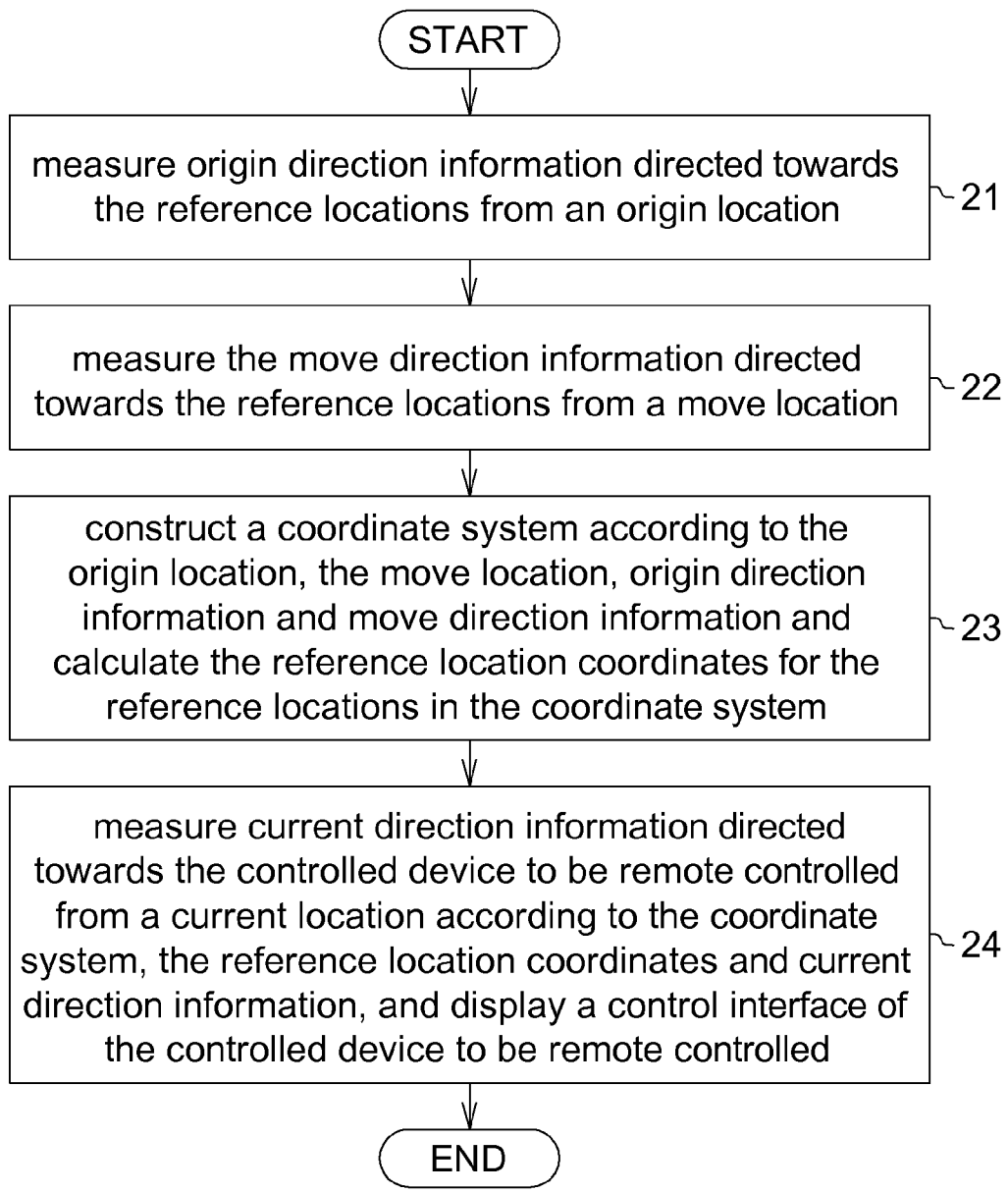
FIG. 2 is a flowchart of a remote control method.
Figure 3:
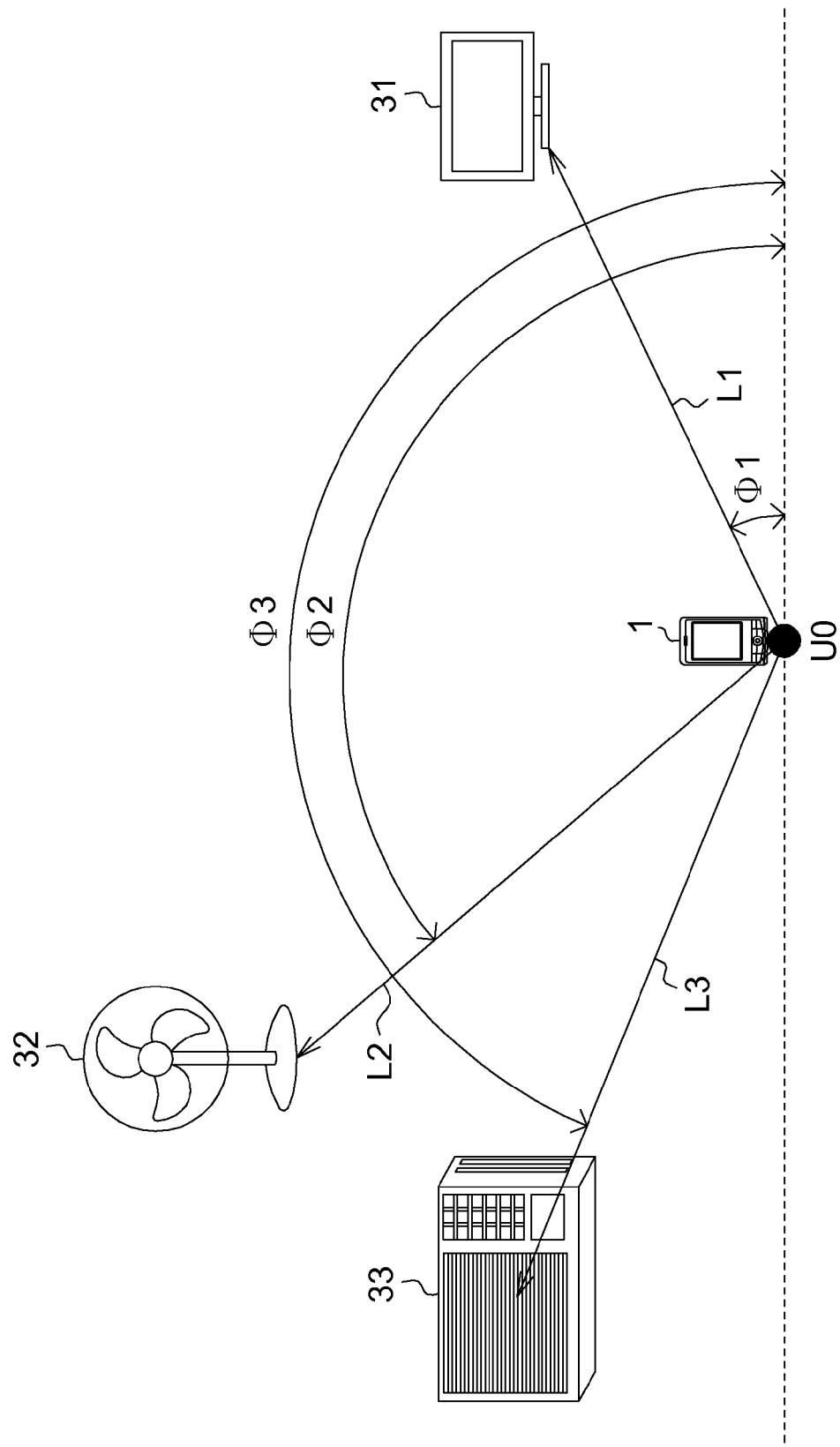
FIG. 3 is a schematic diagram showing a handheld electronic device at an origin location.
Figure 4:
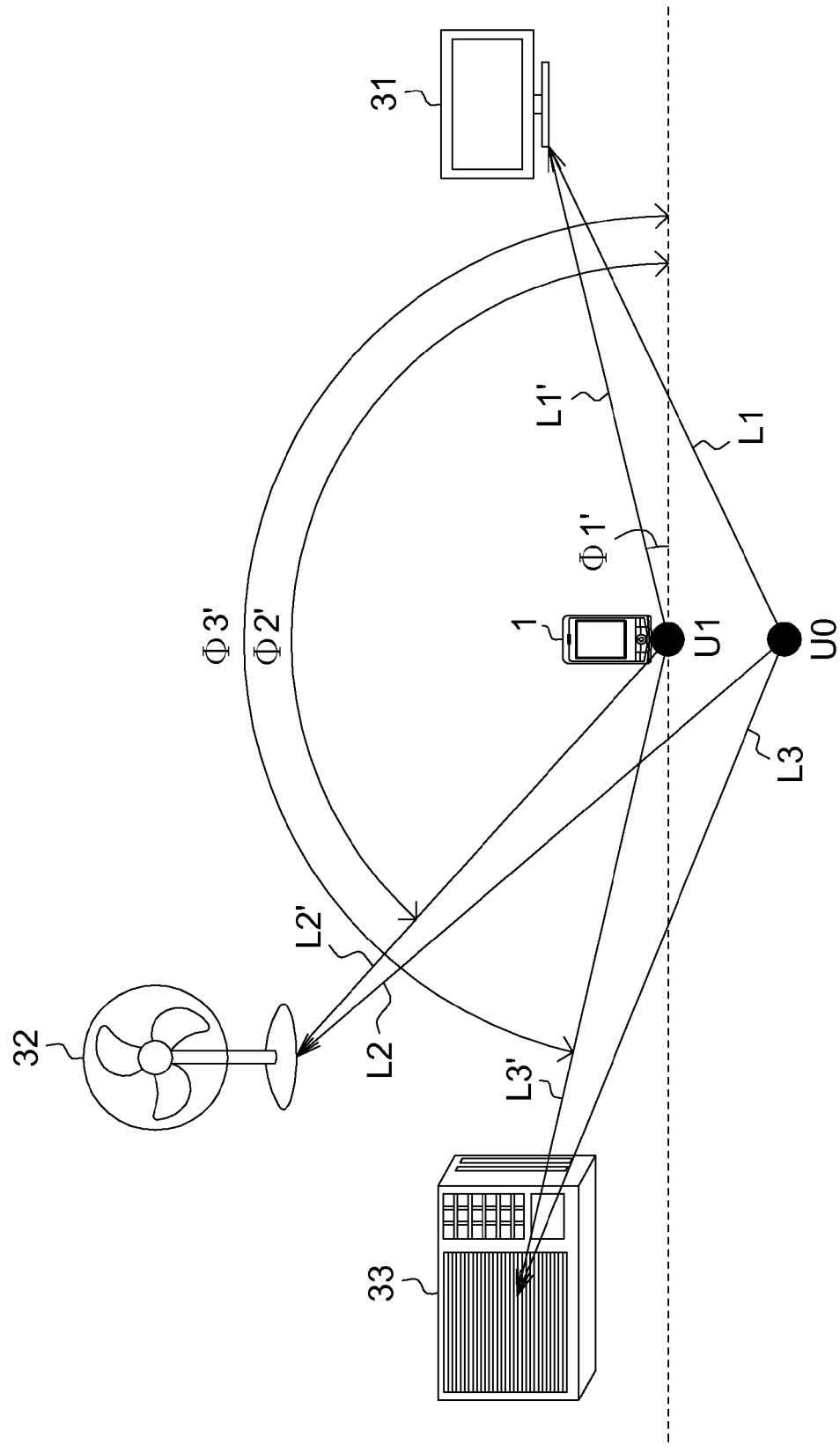
FIG. 4 is a schematic diagram showing a handheld electronic device moved to a move location from the origin location.

Referring to FIG. 1, FIG. 2, FIG. 3, FIG. 4 and FIG. 5. FIG. 1 is a block diagram showing a handheld electronic device. FIG. 2 is a flowchart of a remote control method. FIG. 3 is a schematic diagram showing a handheld electronic device at an origin location. FIG. 4 is a schematic diagram showing a handheld electronic device moved to a move location from the origin location. The handheld electronic device 1 comprises an electronic compass 11, a processing unit 12, a display unit 13 and an input unit 14. The handheld electronic device 1 is such as a mobile phone or a tablet PC. The display unit 13 and the input unit 14 are, for example, integrated as a touch screen. The processing unit 12 couples with the electronic compass 11, the display unit 13 and the input unit 14. When the user holding the handheld electronic device 1 enters an indoor room such as a bedroom, a lounge or an office, the remote control method, applicable to the handheld electronic device 1, comprises the following steps.

Firstly, as shown in step 21, these origin direction information $\phi_1 \sim \phi_3$ directed towards the controlled devices 31~33 from the origin location U0 are measured by the electronic compass 11. The controlled devices 31~33 are correlated with reference locations exemplified by the actual locations of the controlled devices 31~33 in the present embodiment of the invention. The aforementioned controlled devices 31~33 are home appliances such as fans, TVs or air conditioners. These origin direction information $\phi_1 \sim \phi_3$ are such as information of angles. For convenience of elaboration, three controlled devices are exemplified in the present embodiment of the invention. However, the invention is not limited to such exemplification, and the quantity of the controlled devices may be adjusted according to practical application. In addition, when there is only one controlled device disposed at an indoor room, one reference location may be the actual location of the controlled device while the other reference location may be a particular location of the indoor room. For example, the other reference location is a wall corner or a door.

Next, as shown in step 22, these move direction information $\phi1'$~$\phi'$ directed towards the reference locations from the move location U1 are measured by the electronic compass 11. These move direction information $\phi1'$~$\phi'$ are such as information of angles. Furthermore, after the user holding the handheld electronic device 1 makes one stride forward, the current location of the handheld electronic device 1 changes to the move location U1 from the origin location U0. The processing unit 12 defines the distance between the origin location U0 and the move location U1 as a unit length of the coordinate system. In other words, the unit length of the coordinate system is the length of one stride made by the user. Thus, the origin location and the move location respectively correspond to the origin coordinate (0,0) and the coordinate (0,1) of the coordinate system.

Then, as shown in step 23, the processing unit 23, according to the origin location U0, the move location U1, origin direction information $\phi1$~$\phi3$ and the move direction information $\phi1'$~$\phi3'$, constructs the coordinate system and calculates the reference location coordinates for the reference locations in the coordinate system. The equation of a straight line may be obtained from the slope of the straight line and any point passing through the straight line. Besides, any two non-parallel straight lines will intersect at one point. The slope of the straight line may be obtained from the origin direction information and the move direction information measured by the aforementioned electronic compass 11 for determining the reference location coordinates of the controlled devices 31~33 in the coordinate system.

After the system coordinates and the reference location coordinates in the coordinate system are constructed according to the steps 21~23, when the user uses the handheld electronic device 1 for remote-controlling the controlled device 31, the controlled device 32 or the controlled device 33, the handheld electronic device 1 determines the controlled device to be remote controlled by the user according to the electronic compass 11, the coordinate system and the reference location coordinates.

Then, as shown in step 24, the current direction information directed towards the controlled device to be remote controlled from a current location is measured by the electronic compass 11 according to the coordinate system, the reference location coordinates and the current direction information, and the display unit 13 is controlled by the processing unit 12 to display a control interface of the controlled device to be remote controlled.

Figure 5:
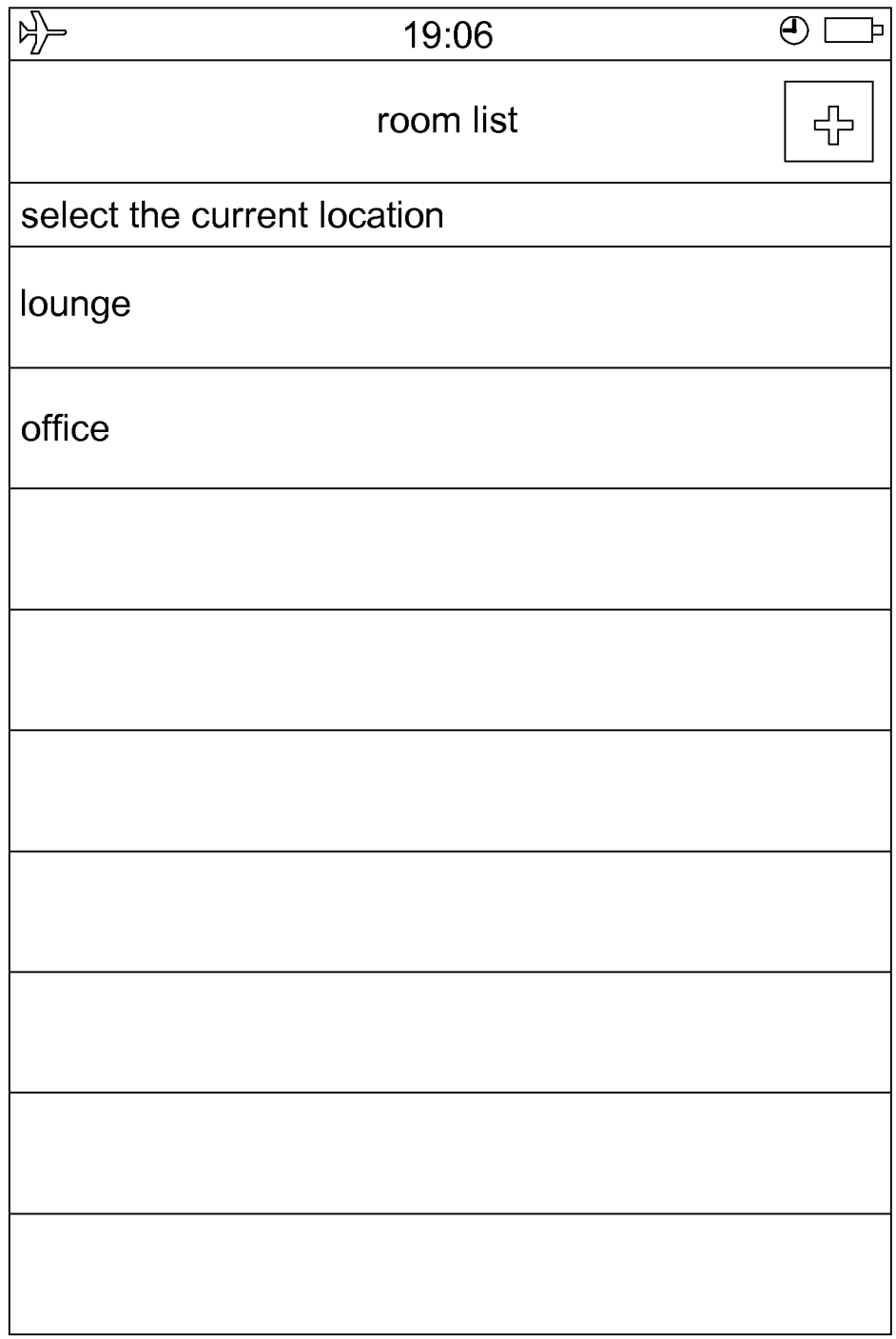
FIG. 5 is a schematic diagram showing a room list.
Figure 6:
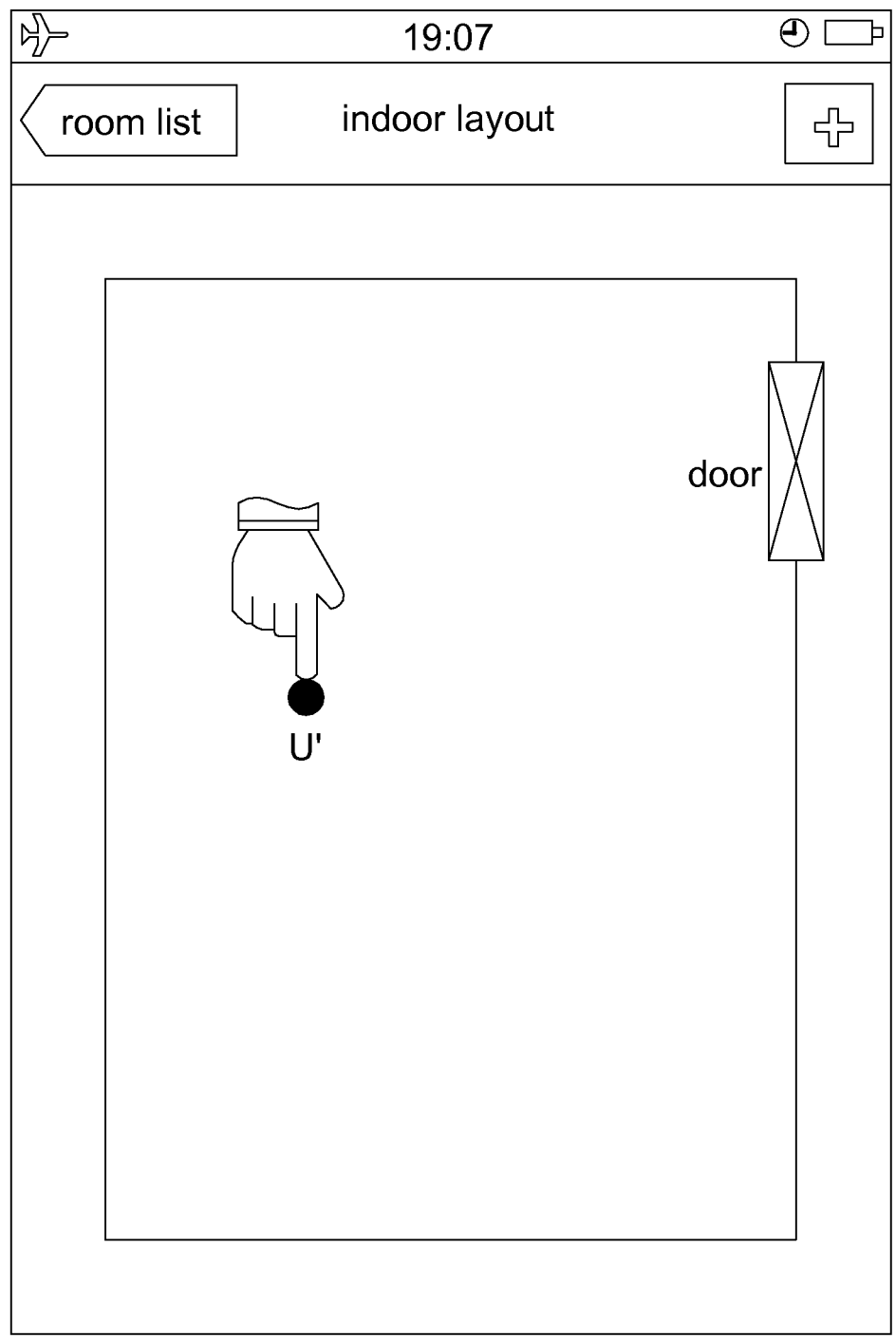
FIG. 6 is a schematic diagram showing an indoor layout and inputting a current related location.
Figure 7:
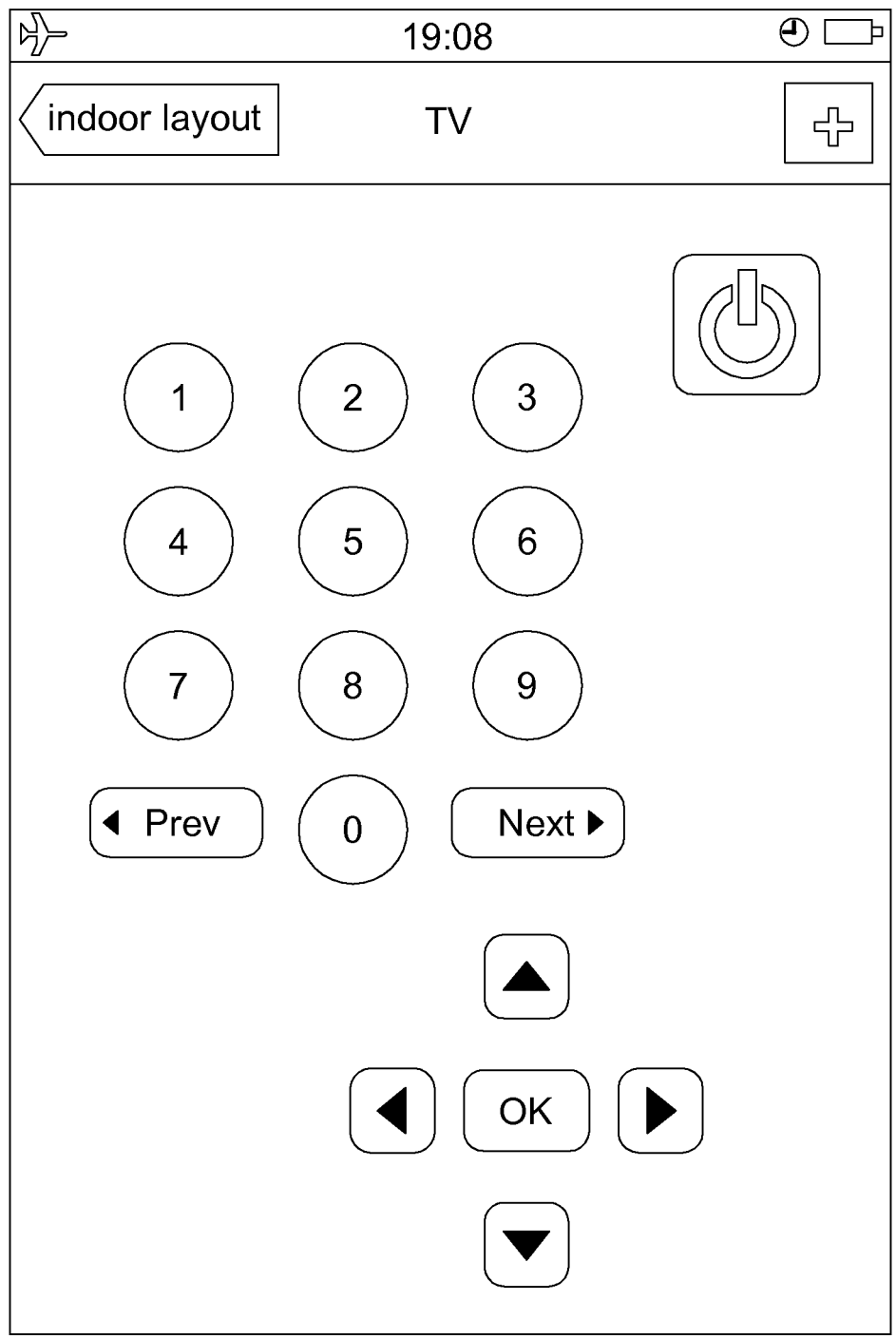
FIG. 7 is a schematic diagram showing a control interface.
Figure 8:
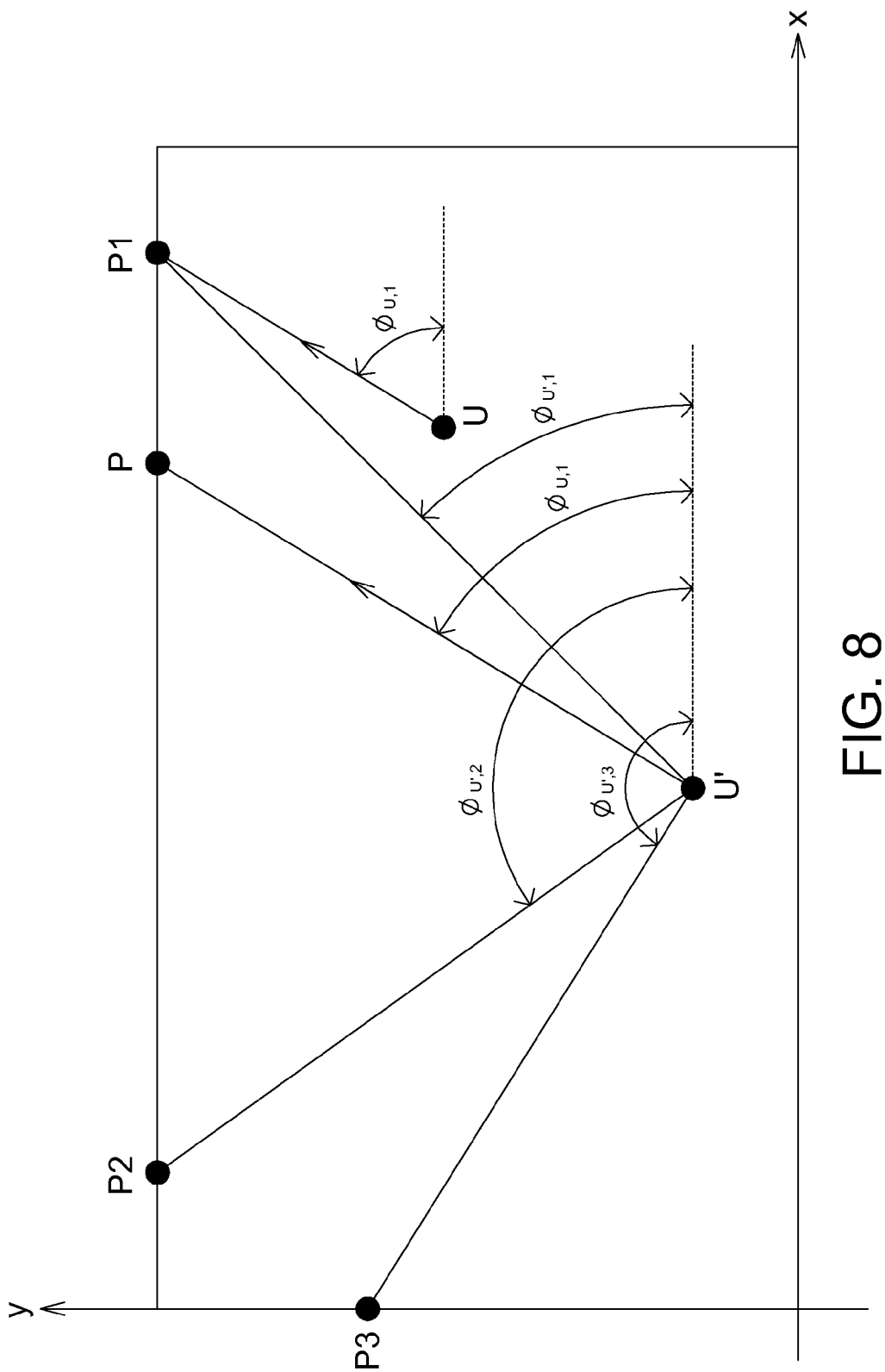
FIG. 8 is a schematic diagram showing a handheld electronic device at a current location.
Figure 9:
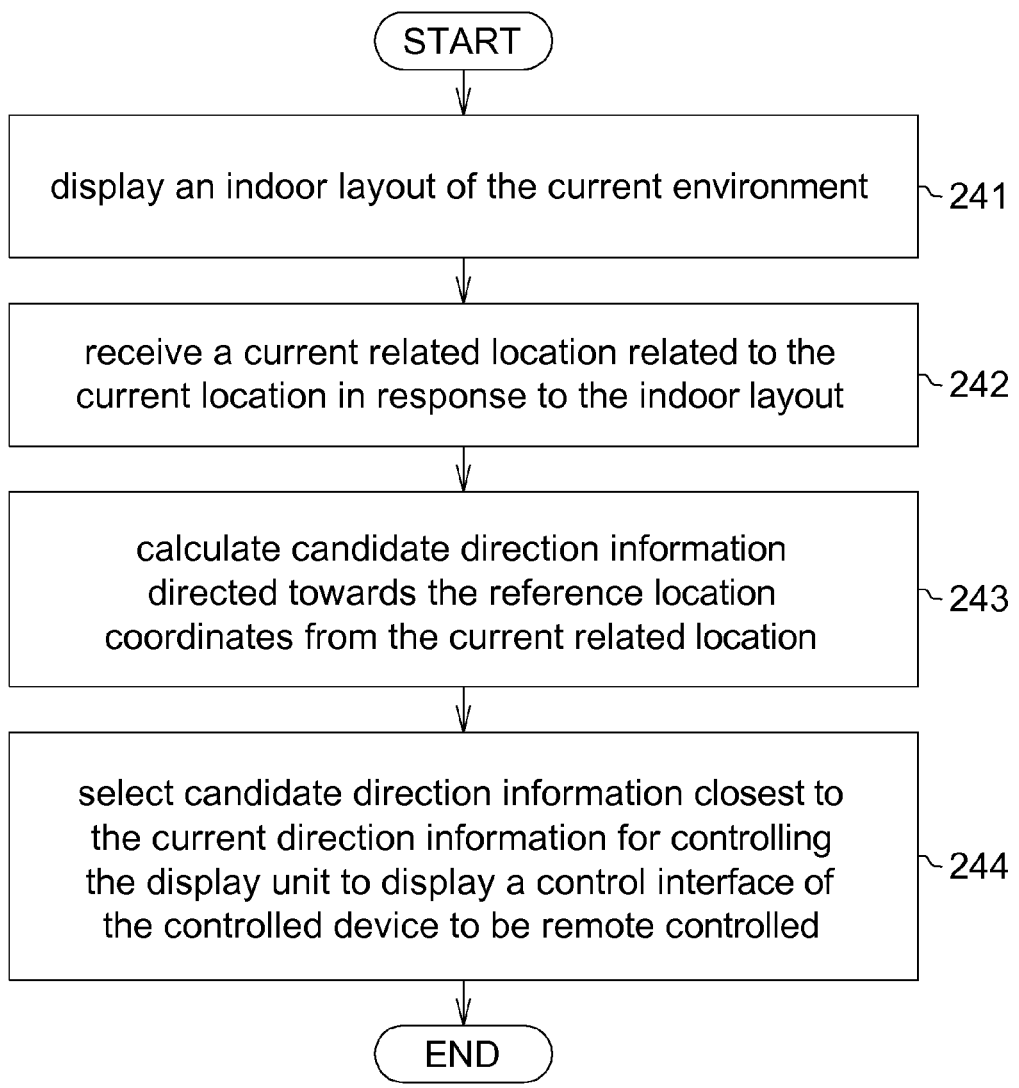
FIG. 9 is a detailed flowchart of step 24 of remote control method.

Referring to FIG. 5, FIG. 6, FIG. 7, FIG. 8 and FIG. 9. FIG. 5 is a schematic diagram showing a room list. FIG. 6 is a schematic diagram showing an indoor layout and inputting a current related location. FIG. 7 is a schematic diagram showing a control interface. FIG. 8 is a schematic diagram showing a handheld electronic device at a current location. FIG. 9 is a detailed flowchart of step 24 of remote control method. The step 24 further comprises steps 241~245. As shown in step 241, an indoor layout of the user's current environment is displayed by the display unit 13. The indoor layout illustrated in FIG. 6 is exemplified as being rectangular. However, the invention is not limited to such exemplification, and the indoor layout may be irregular. Furthermore, the display unit 13 may display the room list illustrated in FIG. 5. The room list comprises a plurality of options such as a lounge or an office. After the user selects room list option via the input device 14, the display unit 13 displays the indoor layout of the user's current environment as illustrated in FIG. 6.

On the indoor layout, the user may click on the current related location U' roughly within the indoor layout. In response to the indoor layout, the input unit 14 receives the current related location U' related to the current location. The current related location U' inputted by the user may be different from the actual current location U.

Then, as shown in step 243, these candidate direction information $\phi_{U',1}$, $\phi_{U',2}$, and $\phi_{U',3}$ that are directed towards the reference location coordinates P1, P2 and P3 from the current related location U' are calculated by the processing unit 12.

Then, as shown in step 244, the candidate direction information $\phi_{U',1}$ closest to the current direction information $\phi_{U,1}$ is selected by the processing unit 12 for controlling the display unit 13 to display a control interface of the controlled device to be remote controlled. For example, the reference location coordinates of the aforementioned controlled devices 31~33 in the coordinate system are respectively designated by P1~P3. The candidate direction information $\phi_{U',1}$ is closest to the current direction information $\phi_{U,1}$. The candidate direction information $\phi_{U',1}$ is directed towards the reference location coordinates P1. The reference location coordinate P1 is a reference location coordinate of the controlled device 31 in the coordinate system. If the controlled device 31 is a TV, then the processing unit 14, according to the candidate direction information $\phi_{U',1}$, controls the display unit 13 to display a control interface as illustrated in FIG. 7.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A handheld electronic device, comprising:
   a display unit;
   an electronic compass for measuring a plurality of origin direction information directed towards a plurality of reference locations from an origin location, wherein the reference locations are correlated with the controlled device, and a plurality of move direction information directed towards the reference locations from a move location are measured when moving from the original location to the move location;
   a processing unit coupling with the electronic compass and the display unit, wherein the processing unit, according to the origin location, the move location, these origin direction information and these move direction information, constructs a coordinate system and calculates the reference locations for a plurality of reference location coordinates in the coordinate system, and after the coordinate system is constructed, the electronic compass measures a current direction information directed towards the controlled device to be remote controlled from a current location, and the processing unit, according to the coordinate system, the reference location coordinates and the current direction information, controls the display unit to display a control interface of the controlled device to be remote controlled; and
   an input unit coupling with the processing unit for receiving a current-related location related to the current location in response to an indoor layout;

wherein the processing unit calculates a plurality of candidate direction information respectively directed toward the reference location coordinates from the current-related location, and selects the candidate direction information closest to the current direction information for controlling the display unit to display a control interface of the controlled device to be remote controlled.

2. The handheld electronic device according to claim 1, wherein, the display unit further displays the indoor layout of the current environment.

3. The handheld electronic device according to claim 2, wherein the indoor layout is rectangular.

4. The handheld electronic device according to claim 2, wherein the indoor layout is irregular.

5. The handheld electronic device according to claim 1, wherein the distance between the origin location and the move location is defined as a unit length of the coordinate system.

6. The handheld electronic device according to claim 5, wherein the unit length of coordinate system is the length of one stride made by the user.

7. The handheld electronic device according to claim 1, wherein the origin location corresponds to the origin coordinates in the coordinate system.

8. The handheld electronic device according to claim 1, wherein the handheld electronic device is a mobile phone.

9. The handheld electronic device according to claim 1, wherein the handheld electronic device is a tablet PC.

10. A remote control method for use in a handheld electronic device, wherein the handheld electronic device comprises a display unit and an electronic compass, and the remote control method comprises:

measuring a plurality of origin direction information directed towards a plurality of reference locations from an origin location by the electronic compass, wherein the reference locations are correlated with the controlled device;

measuring a plurality of move direction information directed towards the reference locations from a move location by the electronic compass when moving from the original location to the move location;

constructing a coordinate system and calculating a plurality of reference location coordinates for the reference locations in the coordinate system according to the origin location, the move location, these origin direction information and these move direction information; and measuring a current direction information directed towards the controlled device to be remote controlled from a current location by the electronic compass according to the coordinate system, the reference location coordinates and the current direction information after the coordinate system is constructed and displaying a control interface of the controlled device to be remote controlled;

receiving a current-related location related to the current location in response to an indoor layout;

calculating a plurality of candidate direction information respectively directed toward the reference location coordinates from the current-related location; and selecting the candidate direction information closest to the current direction information for controlling the display unit to display a control interface of the controlled device to be remote controlled.

11. The remote control method according to claim 10, further comprising:

displaying the indoor layout of the current environment.

12. The remote control method according to claim 11, wherein the indoor layout is rectangular.

13. The remote control method according to claim 11, wherein the indoor layout is irregular.

14. The remote control method according to claim 10, wherein the distance between the origin location and the move location is defined as a unit length of the coordinate system.

15. The remote control method according to claim 14, wherein the unit length of the coordinate system is the length of one stride made by the user.

16. The remote control method according to claim 10, wherein the origin location is the origin of the coordinate system.

17. The remote control method according to claim 10, wherein the handheld electronic device is a mobile phone.

18. The remote control method according to claim 10, wherein the handheld electronic device is a tablet PC.

* * * * *